(12) United States Patent
Saikalis et al.

(10) Patent No.: US 6,568,261 B1
(45) Date of Patent: May 27, 2003

(54) HOT WIRE GAS FLOW SENSOR

(75) Inventors: George Saikalis, West Bloomfield, MI (US); Shigeru Oho, Farmington Hills, MI (US); Takashi Kadohiro, Livonia, MI (US)

(73) Assignee: Hitachi America, Ltd., Tarrytown, NY (US)

( * ) Notice: Subject to any disclaimer, the term of this patent is extended or adjusted under 35 U.S.C. 154(b) by 0 days.

(21) Appl. No.: 09/688,585

(22) Filed: Oct. 16, 2000

(51) Int. Cl.⁷ ................................................. G01F 1/68
(52) U.S. Cl. .................................................. 73/204.27
(58) Field of Search ........................... 73/204.27, 204.26, 73/204.14, 118.2, 204.17, 204.16, 204.19, 204.11, 204.22, 204.23

(56) References Cited

U.S. PATENT DOCUMENTS

| | | | | |
|---|---|---|---|---|
| 5,353,765 A | * | 10/1994 | Saikalis et al. | 123/438 |
| 5,355,855 A | | 10/1994 | Saikalis | 123/438 |
| 5,392,646 A | * | 2/1995 | Yajima | 73/204.19 |
| 5,544,079 A | * | 8/1996 | Saikalis | 364/571.01 |
| 5,595,163 A | * | 1/1997 | Nogi et al. | 123/494 |
| 5,654,506 A | | 8/1997 | Yoneda et al. | 73/204.11 |
| 5,804,712 A | * | 9/1998 | Staerzl | 73/117.2 |
| 5,952,571 A | * | 9/1999 | Arai et al. | 73/204.11 |

FOREIGN PATENT DOCUMENTS

| | | | | |
|---|---|---|---|---|
| JP | 03081621 | * | 4/1991 | 73/204.27 |
| JP | 10-281835 | | 10/1998 | |

* cited by examiner

*Primary Examiner*—Hezron Williams
*Assistant Examiner*—Lilybett Martir
(74) *Attorney, Agent, or Firm*—Gifford, Krass, Groh, Sprinkle, Anderson & Citkowski, P.C.

(57) ABSTRACT

An improved hot wire gas flow sensor is disclosed having a housing with a passageway in series with a passageway through which the gas flow is measured. The housing includes both a hot wire and cold wire disposed within the passageway. A current circuit maintains the temperature differential between the hot wire and cold wire preferably in the range of 30° C. to 100° C. by varying the current flow through the hot wire. Current limiting circuitry is then utilized to limit the current flow through the hot wire and thus the temperature of the hot wire in order to prevent possible combustion of the gas in the passageway. Additionally, a current augmenting circuit augments the current flow through the hot wire for a limited period of time following the electrical energization of the flow sensor in order to provide rapid heat up of the hot wire in the hot wire sensor. Improvements are also disclosed for fluidly sealing the electrical leads to both the hot wire and cold wire to prevent gas leakage from the sensor.

32 Claims, 7 Drawing Sheets

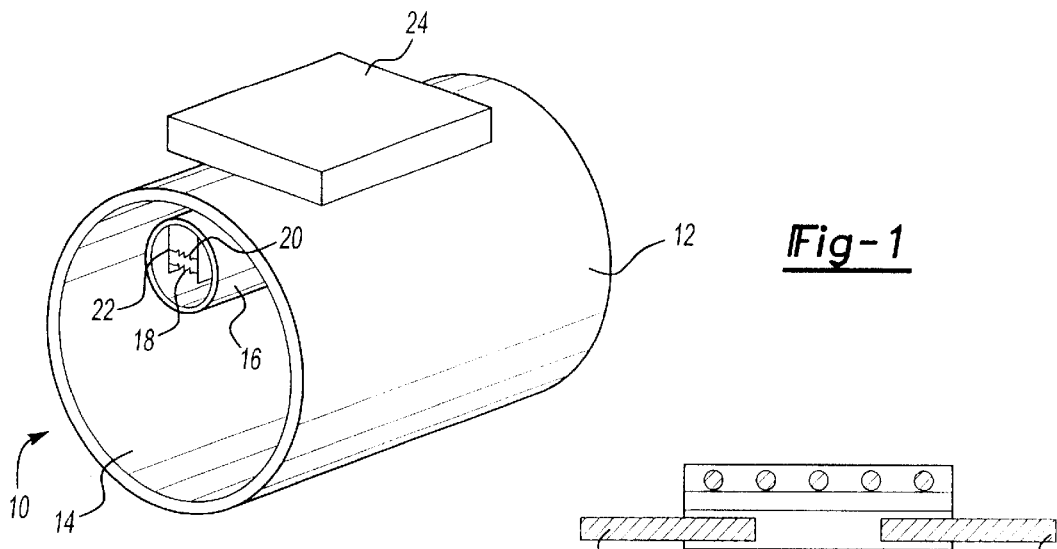

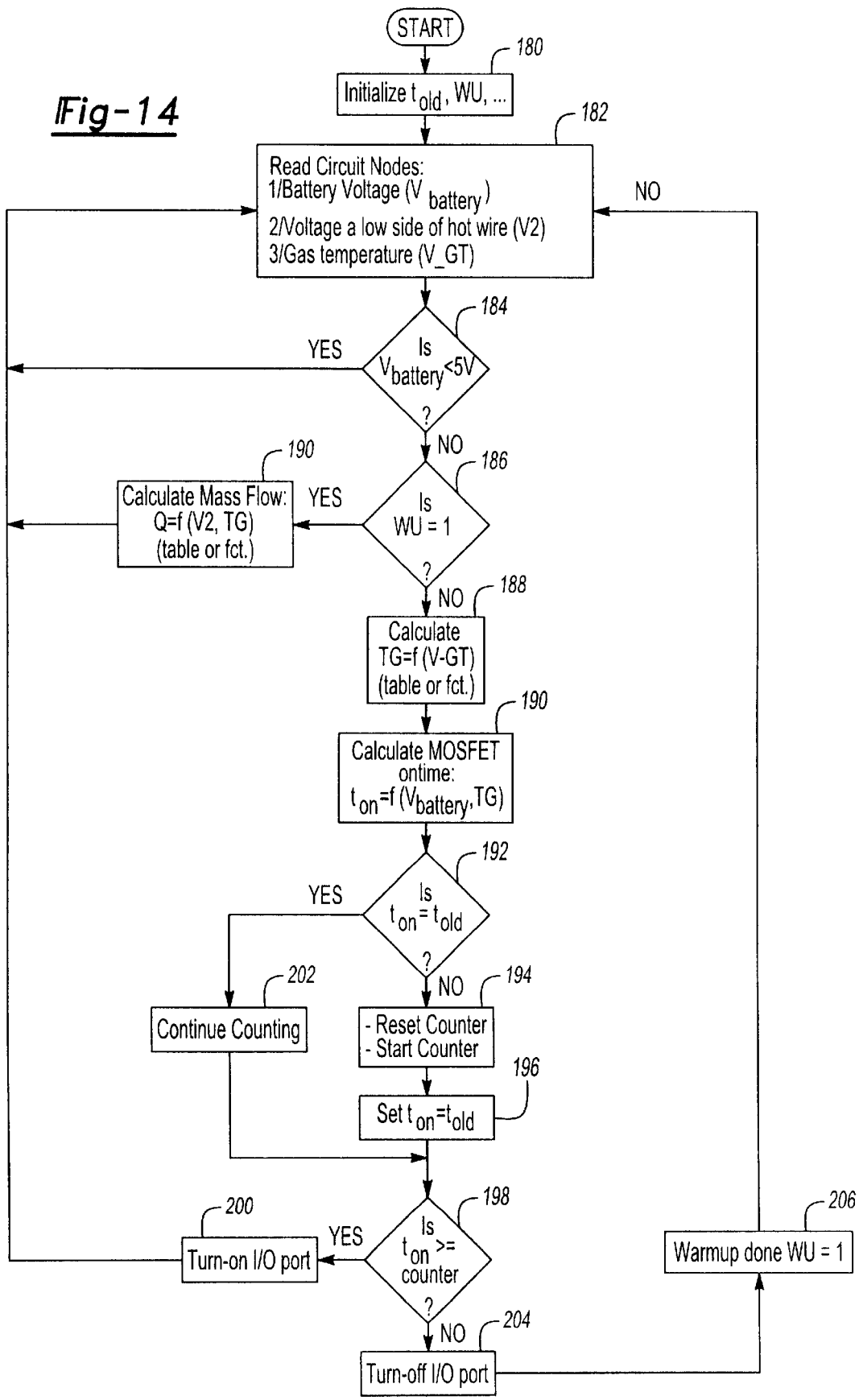

HOT WIRE GAS FLOW SENSOR

BACKGROUND OF THE INVENTION

I. Field of the Invention

The present invention relates generally to mass gas flow sensors and, more particularly, to a hot wire gas flow sensor.

II. Description of Related Art

There are many previously known mass gas flow sensors which provide analog output signals proportional to the mass of gas flow through the sensor. One such type of previously known mass gas flow sensor is known as a hot wire sensor. Such hot wire sensors are frequently used in the automotive industry.

In the previously known hot wire sensors, the hot wire sensor includes a housing having a throughbore through which the gas flows. Both a hot wire and a cold wire are positioned within a bypass bore in the housing while an analog electronic circuit maintains a temperature differential between the hot wire and cold wire at a predetermined amount. For gasoline engines in which the sensor measures the mass of the air/fuel mixture, the temperature differential between the hot and cold wire is typically maintained at 200° C. by varying the current flow through the hot wire.

In practice, gas flow through the housing bore cools the hot wire. Consequently, in order to maintain the temperature differential between the hot and cold wire, the current flow through the hot wire is increased by the electronic circuit in an attempt to maintain the constant 200° C. temperature differential between the hot and cold wire. The current flow through the hot wire in effect forms a signal proportional to the mass gas flow through the sensor housing bore.

While these previously known mass gas flow sensors have proven adequate in the automotive industry where the flow rate of the air/fuel gaseous mixture, or alternatively just the air intake flow rate, these previously known flow sensors have presented special problems for measuring other types of gas flows, such as the gas flow for hydrogen, propane, methane and other combustible fuels.

One disadvantage of these previously known flow sensors is that, by maintaining the temperature differential between the hot and cold wire at the conventional 200° C. differential, is that potential combustion or ignition of the gas through the sensor is possible. This is particularly true where the sensor is used in environments where the ambient temperature of the gas is relatively high.

A still further disadvantage of these previously known flow sensors is that failure of any one of several different sensor components may result in excessive current flow through the hot wire. This excessive current, in turn, heats the hot wire to an elevated temperature possibly causing combustion of the gas flow through the sensor.

A still further disadvantage of these previously known hot wire flow sensors is that a relatively lengthy warm up time is required before the hot wire reaches its operating temperature. This in turn results in inefficient operation of whatever device, e.g. a fuel cell or engine, that is operatively coupled with the fuel sensor.

Additionally, it has been difficult, and therefore expensive, to seal these previously known flow sensors from gas leaks around the post which supports the leads leading to both the hot and cold wire sensor under high pressure situations.

SUMMARY OF THE PRESENT INVENTION

The present invention provides improvements in gas flow sensors which overcomes all of the above-mentioned disadvantages of the previously known devices.

In brief, the gas flow sensor of the present invention comprises a housing having a fluid passage which is coupled in series with a passage through which the measurement of the gaseous flow is desired. The sensor housing typically includes a bypass passageway so that only a portion of the gas flow through the sensor housing passes through the bypass passageway.

In the conventional fashion, a post is secured to the housing and extends radially inwardly into the bypass bore so that an inner end of the post is positioned substantially centrally within the bypass bore. Both a hot wire constructed of an electrical resistive material as well as a cold wire are secured to the free end of the post while the electrical leads from both the cold wire and hot wire extend through the post and to control circuitry associated with the flow sensor.

Consequently, in the conventional fashion, a temperature differential between the hot wire and cold wire is maintained at a predetermined amount by the control circuitry by varying the current flow through the hot wire in an amount necessary to maintain this temperature differential. The current flow through the hot wire is then proportional to the mass gas flow through the sensor and this current flow through the hot wire provides an output signal representative of that mass gas flow rate.

Unlike the previously known flow sensors, however, the temperature differential between the hot wire and cold wire is maintained at a preset amount in the range of 30° C. to 100° C., and preferably substantially 65° C. Due to the high thermal conductivity of many gases, such as hydrogen, propane, methane and the like, a relatively low temperature differential between the hot wire and cold wire in the range of 30° C. to 100° C. is sufficient to provide an accurate measurement of the gas flow rate through the sensor.

In certain situations resulting from component failure of either the control circuitry or failure of the cold wire, excessive current flow through the hot wire can result thus resulting in excessive heating of the hot wire and possible combustion of the gas flowing through the sensor. In order to eliminate the possibility of such combustion, the present invention provides several hardware as well as software techniques to prevent the flow of excessive current through the hot wire.

In one embodiment a Zener diode is connected in parallel across the positive end of the hot wire and ground so that the voltage imposed across the Zener diode is proportional to the voltage across the hot wire. Consequently, whenever the voltage drop across the hot wire, and thus the current flow through the hot wire, exceeds a predetermined amount, the Zener diode conducts and prevents the further increase of current through the hot wire.

In another form of the invention, a driving transistor is utilized to provide current flow from the power source to the hot wire. In the event of failure of the driving transistor, a Zener diode clamped either across the emitter or collector of the driving transistor, or optionally across the base, is utilized to limit current flow through the driving transistor and consequently current flow through the hot wire.

Still other means are disclosed for limiting the current flow through the hot wire in the event of failure of one or more components of the control circuitry for the sensor and/or the failure of the cold wire. For example, in one embodiment, a software control is utilized to sense the voltage drop across the hot wire and then limit any further increase of the current flow through the hot wire under software control.

The present invention further provides circuitry for augmenting the current flow through the hot wire following the electrical energization of the hot wire. Such augmentation is advantageous in that it provides rapid heat up of the hot wire so that the hot wire reaches its operating temperature more quickly. In one embodiment, an RC timing circuitry is alternatively connected between the power source and the hot wire or between the power source and the base of the driving transistor for the hot wire. This RC timing circuit increases the current flow to the hot wire as a function of both the capacitance and resistance of the RC timing circuit. Alternatively, however, augmentation of the initial startup current to the hot wire can be obtained through software control or by other means.

The present invention further provides enhanced sealing of the lead wires from both the hot wire and cold wire through the housing post. In the preferred embodiment of the invention, a cavity is formed within the post through which the lead wires for both the hot wire and cold wire extend. This cavity is then filled with a sealing material thereby preventing leakage of gas along the lead wires for the hot wire and cold wire.

Additionally, both the hot wire and cold wire are preferably sealed to protect the hot and cold wire from the gas flow through the sensor housing. Glass, polyamide, epoxy or other sealing means can be used to seal the hot and cold wires. Additionally, special materials, such as gold, stainless steel or the like may be used for the lead wires for both the hot wire and cold wire.

BRIEF DESCRIPTION OF THE DRAWING

A better understanding of the present invention will be had upon reference to the following detailed description, when read in conjunction with the accompanying drawing, wherein like reference characters refer to like parts throughout the several views, and in which:

FIG. 1 is a perspective view illustrating an exemplary gas flow sensor of the present invention;

FIG. 2 is an enlarged longitudinal sectional view illustrating the hot wire component of the preferred embodiment of the invention;

FIG. 3 is a schematic view of a control circuit for the flow sensor;

FIG. 4 is a schematic view of the control circuit for the flow sensor, but illustrating additional component failure circuitry;

FIG. 14 is a flow chart for use with the circuitry of FIG. 13;

DETAILED DESCRIPTION OF PREFERRED EMBODIMENTS OF THE PRESENT INVENTION

Figure 5:
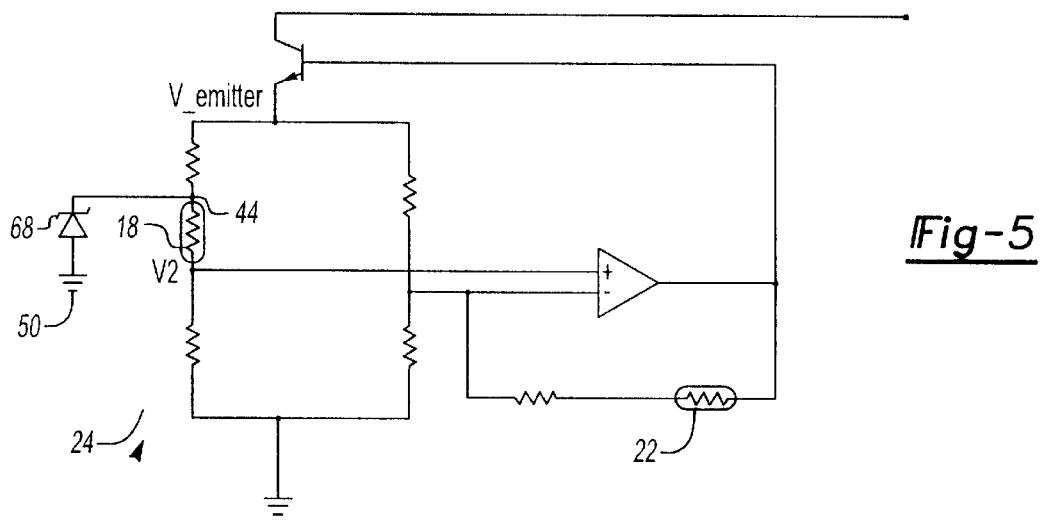
FIG. 5 is a view similar to FIG. 4 but illustrating a modification thereof.

With reference first to FIG. 1, a diagrammatic view of a hot wire gas flow sensor 10 is there shown having a housing 12. The housing 12 defines a flow passage 14 which is connected in series with the passageway through which the mass gas flow of the gas to be measured passes. Consequently, all of the gas flow through the passageway also flows through the interior passage 14 of the sensor housing 12.

Preferably, a bypass tube 16 is positioned within the housing passage 14 so that a portion of the gas entering the housing 14 passes through the bypass tube 16. A hot wire 18 constructed of a resistive material is supported by a post 20 substantially in the center of the bypass tube 16. Similarly, a cold wire 22 is also supported by the post adjacent the hot wire 18 so that gaseous fuel flow through the bypass tube 16 impinges against both the hot wire 18 and cold wire 22.

Control circuitry 24, which will be hereinafter described in greater detail, controls the current flow through the hot wire 18 to maintain the temperature differential between the hot wire 18 and cold wire 22 at a predetermined amount. In doing so, the magnitude of the current flow through the hot wire 18 is proportional to the mass gas flow through the bypass tube 16 and thus through the sensor housing 12.

Unlike the previously known mass gas flow sensors, the temperature differential between the hot wire 18 and cold wire 22 is maintained in the range of 30° C.–100° C. and preferably substantially 65° C. By maintaining this relatively low temperature differential, the flow sensor 10 of the present invention may be utilized in applications where combustible gases, such as propane, methane, hydrogen, natural gas and the like, flow through the sensor housing 12. By maintaining a relatively low temperature differential between the hot wire sensor 18 and cold wire sensor 22, possible combustion of the gas flow through the housing 12 is effectively precluded. Furthermore, it will be understood that the flow sensor 10 may be used in applications other than in internal combustion engines, such as fuel cell applications as well as other applications.

In order to calculate the preferred temperature differential between the hot wire 18 and cold wire 22, the following relationships must be realized:

$T_{FC} < T_H$ $T_H < T_{max}$ where $T_{FC}$=the operating temperature of the gas $T_H$=the temperature of the hot wire and $T_{max}$ is the maximum temperature that the hot wire can safely reach.

Furthermore, $T_H = T_{gas} + \Delta T$ where $\Delta T$ is the temperature differential between the hot wire and cold wire.

For example, assuming that the operating gas is hydrogen and that $T_{FC} = 80°$ C. while the temperature of the gas $T_{gas} = 100°$ C., the maximum gas temperature $T_{max}$ must be selected to create a safe condition and thus should be less than 300° C.

The thermal convection from the hot wire is then defined as $$P = h(T_H - T_{gas}) = h \cdot \Delta T$$

The heat transfer coefficient h for the hot wire is then defined in accordance with King's Law as follows:

$$h = s_h \left[ 2.4 + 1.6 \left( \frac{u \cdot D}{v(T_F)} \right)^{0.35} \right] \frac{\lambda(T_F)}{D}$$

Where:
- $S_h$: Surface area of the hot wire ($\pi.D.L$)
- u: Gas velocity [m/s]
- D: Hot wire diameter [m]
- $v(T_F)$: Kinematic Viscosity [m²/s]
- $\lambda(T_F)$: Thermal conductivity [W/m.K]
- $T_F$: Hot wire surface (film) temperature [K]

Because of the air cooling effect on the surface of the hot wire, we assume that the hot wire surface (film) temperature can be estimated as follows:

$$T_F = \frac{T_H + T_G}{2}$$

where $T_F$ is the average between the hot wire temperature and gas temperature.

At the same gas speed and ΔT, the hydrogen power requirement will be much higher as the thermal conductivity of hydrogen is much larger than air. To resolve this power increase requirement, ΔT needs to be reduced accordingly to match the air flow sensor operation as described in (1) and (2).

To provide the correct power rating (proportional to electrical current into the hot wire) and provide good reliability, the following will be applicable.

$$\Delta T_{\text{hydrogen}} = \Delta T_{air} \frac{h_{air}}{h_{\text{hydrogen}}} = \sim 65° \text{ C}.$$

Other gases will have different requirements and operating temperature.

In practice, the temperature differential between the hot wire and cold wire for hydrogen should be at least 30° C. in order to maintain dynamic range for the flow sensor, while a temperature differential in excess of 100° C. between the hot wire and cold wire presents a possible safety hazard.

With reference now to FIG. 2, the exposure of current hot wire and cold wire components to certain gases, such as hydrogen, methane, and the like may result in degradation of the hot wire and/or cold wire. Accordingly, as best shown in FIG. 2, the hot wire 18, as well as the cold wire 22 (not illustrated), is preferably encased in a protective coating material 30. This coating material 30 is an electrically insulating material and can comprise, for example, glass, polyamide and other types of epoxies. The coating 30, furthermore, is preferably inert to the gas for which the flow sensor is utilized.

The coating material 30 around the hot wire not only suppresses sparks from the hot wire in the event of failure of the hot wire, but also reduces the exposed area of platinum from the gas flow through the sensor. Special types of materials, such as stainless steel, nickel, gold and the like may be utilized for the leads 32 for the hot wire 18 in order to minimize or eliminate degradation of the leads 32 resulting from exposure to the gas flow through the sensor 10.

Many gases are highly flammable so that ignition of the gas flow through the flow meter 10 can cause undesirable results. Many of the gases, furthermore, have low autoignition temperatures. For example, hydrogen has an autoignition temperature of 571° C. while methane has an autoignition temperature of substantially 537° C.

As long as the flow sensor is operating in its normal fashion, the temperature of the hot wire 18 is always maintained well below the autoignition temperatures of even highly flammable gases such as hydrogen and methane. However, failure of one or more components in the control circuitry 24 (FIG. 1) of the flow sensor 10 and/or failure of the cold wire could cause excessive current to flow through the hot wire and thus cause the hot wire to heat to temperatures in the autoignition range of certain gases.

More specifically, with reference to FIG. 3, a simplified diagram of the control circuitry 24 for the hot wire 18 is there shown. This control circuitry 24 includes a driving transistor 40 having its emitter-collector circuit connected in series between the power source 42 and one end 44 of the hot wire 18. The other end 46 of the hot wire 18 is coupled through a resistor 48 to ground 50.

Still referring to FIG. 3, a voltage op-amp 52 has one input 54 connected to the output end 46 of the hot wire sensor. The other input 56 of the op-amp 52 is connected between a voltage divider formed by two resistors 58 and 60. The output 62 of the op-amp 52 is coupled to the base of the transistor 40 and thus, under normal operation, controls the, current flow through the transistor 40 and thus through the hot wire 18. Lastly, the cold wire 22 is coupled as a feedback signal between the op-amp output 62 and its input 56.

There are several different failures of the control circuitry 24 that can occur. For example, the cold wire 22 could be cut which would cause an open feedback loop for the op-amp 52. This in turn would cause the op-amp 52 to further drive the transistor 40 thus increasing the current flow to the hot wire Alternatively, the driving transistor 40 could suffer a short between its emitter and collector. If this happens, the power source 42 would be effectively connected to the end 44 of the hot wire 18 regardless of the base voltage provided to the driving transistor 40 by the op-amp 52.

Similarly, the op-amp 52 could fail and result in a condition where its output 62 is stuck in a high condition. If this were to occur, the op-amp 52 would continuously drive the driving transistor 40 to a more conductive state thus increasing the current flow to the hot wire 18.

A still further failure mode of the circuitry 24 would result if the end 44 of the hot wire 18 were somehow shorted to the power source 42. This would also result in excessive current flow through the hot wire 18 coupled with excessive heating of the hot wire 18.

With reference now to FIG. 4, a first embodiment of the protective circuitry which limits the current flow through the hot wire 18 is there shown and comprises a Zener diode 66 which is electrically connected between the base of the driving transistor 40 and ground 50. The Zener diode 66 is selected so that, in the event that either the op-amp 52 has its output stuck high or the cold wire 22 has been cut, the Zener diode 66 will limit the base voltage to a predetermined maximum defined by the Zener diode 66. As such, the Zener diode 66 effectively limits the current flow through the hot wire 18 in the desired fashion.

With reference now to FIG. 5, a still further embodiment of a protective circuit to limit the current flow through the hot wire 22 is there shown. In FIG. 5, a Zener diode 68 is electrically connected between the end 44 of the hot wire 18 and ground 50. By electrically connecting the Zener diode 68 across the hot wire 18, the Zener diode 68 effectively limits the voltage potential across the hot wire 18, and thus the current flow through the hot wire 18, to a predetermined maximum defined by the voltage of the Zener diode 68. The circuitry illustrated in FIG. 5 thus effectively prevents excessive current flow through the hot wire 18 regardless of which portion of the circuitry of the control circuit 24 has failed.

Figure 6:
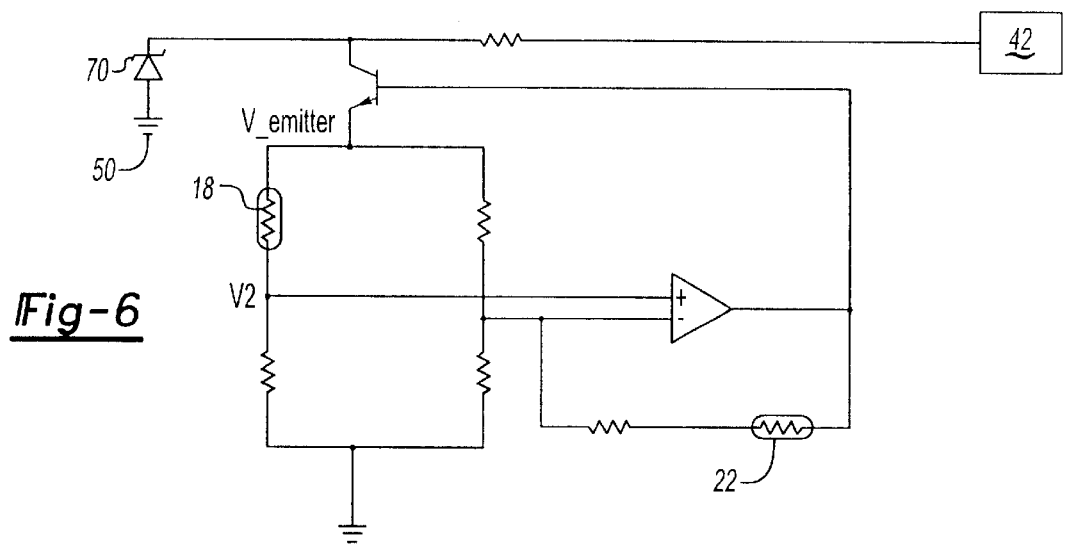
FIG. 6 is a view similar to FIGS. 4 and 5 but illustrating a modification thereof.

With reference now to FIG. 6, a still further embodiment of the circuitry for limiting the maximum current through the hot wire 18 is shown in which a Zener diode 70 is connected between the voltage source 42 and ground 50. The Zener diode 70 thus limits the maximum voltage potential across the hot wire 18 to a predetermined amount in dependence upon the voltage of the Zener diode 70. As before, the Zener voltage is selected to prevent excessive hot wire heating.

Figure 7:
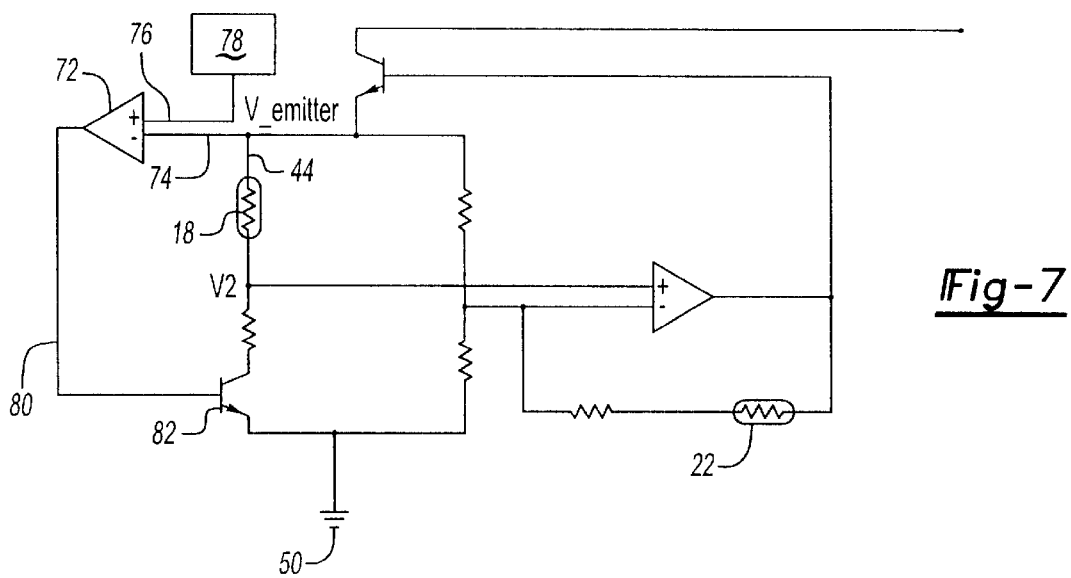
FIG. 7 is a view similar to FIGS. 4–6 but illustrating a modification thereof.

With reference now to FIG. 7, still a further embodiment of circuitry to limit the maximum current flow through the hot wire 18 is illustrated in which a voltage comparator 72 has one input 74 connected to the end 44 of the hot wire 18 and its other input 76 connected to a voltage reference 78. The output 80 from the voltage comparator 72 is then connected to an electronic switch 82, such as to the base of a transistor, which is connected in series between the hot wire 18 and ground 50. Thus, whenever the voltage at the end 44 of the hot wire 18 is less than a predetermined amount defined by the voltage reference 78, the comparator 72 maintains the switch 82 in a closed position so that the hot wire 18 operates in the conventional fashion. Conversely, in the event that the voltage at the end 44 of the hot wire 18 exceeds the reference voltage 78, the voltage comparator 72 switches the electronic switch 82 to an open position thus terminating current flow through the hot wire 18 and preventing excessive heating of the hot wire 18.

Figure 8:
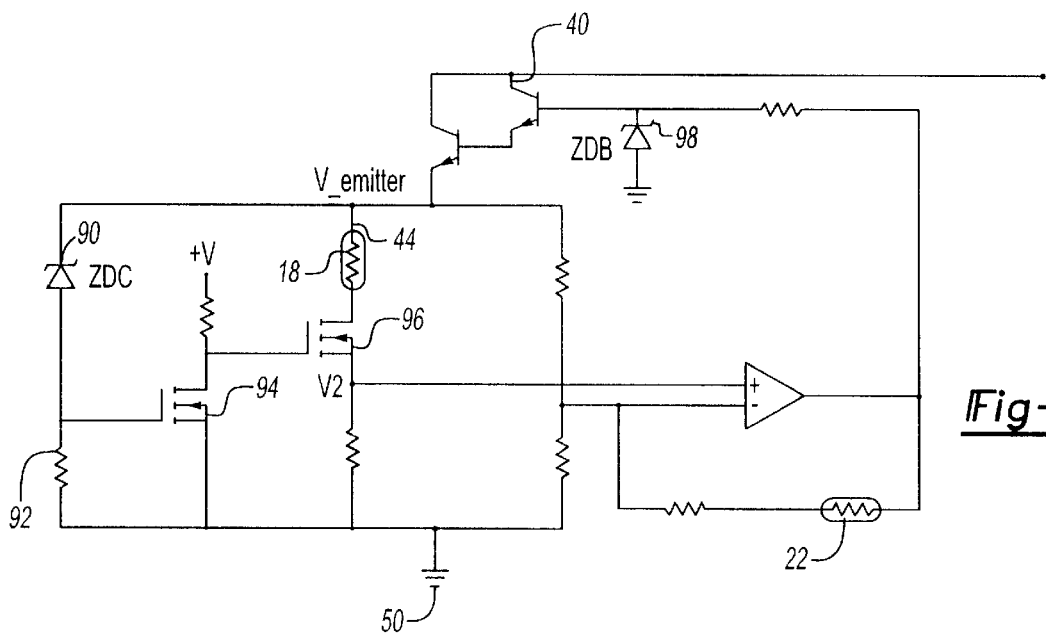
FIG. 8 is a view similar to FIGS. 4–7 but illustrating a modification thereof.

With reference now to FIG. 8, a still further embodiment of the current limiting protection circuitry is there shown in which a Zener diode 90 is connected between the end 44 of the hot wire 18 and ground 50 through a resistor 92. The node between the Zener diode 90 and resistor 92 is coupled as a switching signal to an FET 94 having its source connected to the gate of a still further FET 96. The FET 96 is connected in series with the hot wire 18.

Consequently, in the event that the voltage across the hot wire 18 exceeds a predetermined amount, the Zener diode 70 conducts which in turn causes the FET 94 to conduct. As the FET 94 conducts, the FET 94 switches the FET 96 to an open position thus terminating current flow through the hot wire 18 in the desired fashion. FIG. 8 also preferably utilizes a further Zener diode 98 which clips the input signal to the driving transistor 40, illustrated in FIG. 8 as a Darlington pair, to prevent false triggering of the Zener diode 90.

Figure 9:
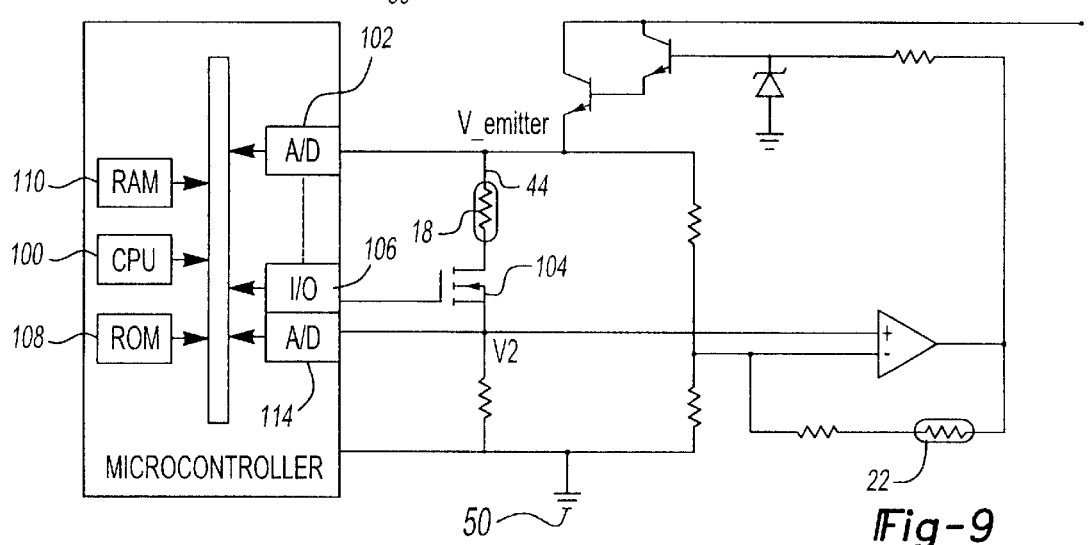
FIG. 9 is a view similar to FIGS. 4–8, but illustrating a modification thereof.

FIGS. 3–8 have all been directed to hardware circuitry designs to limit the current flow through the hot wire 18 to a predetermined maximum in order to prevent overheating of the hot wire. With reference now to FIG. 9, a software approach for limiting the current through the hot wire 18 is there shown in which a microprocessor 100 periodically reads the voltage at the hot wire end 44 through an analog/digital converter 102. An electronic switch 104, such as an FET, is connected in series between the hot wire 18 and through a resister to ground 50. The operation of the electronic switch 104, in turn, is controlled by an I/O port 106 operated by the microprocessor 100. In the conventional fashion, the microprocessor 100 has access to both read only memory 108 containing, for example, the software code, as well as random access memory 110 to store program variables.

Figure 10:
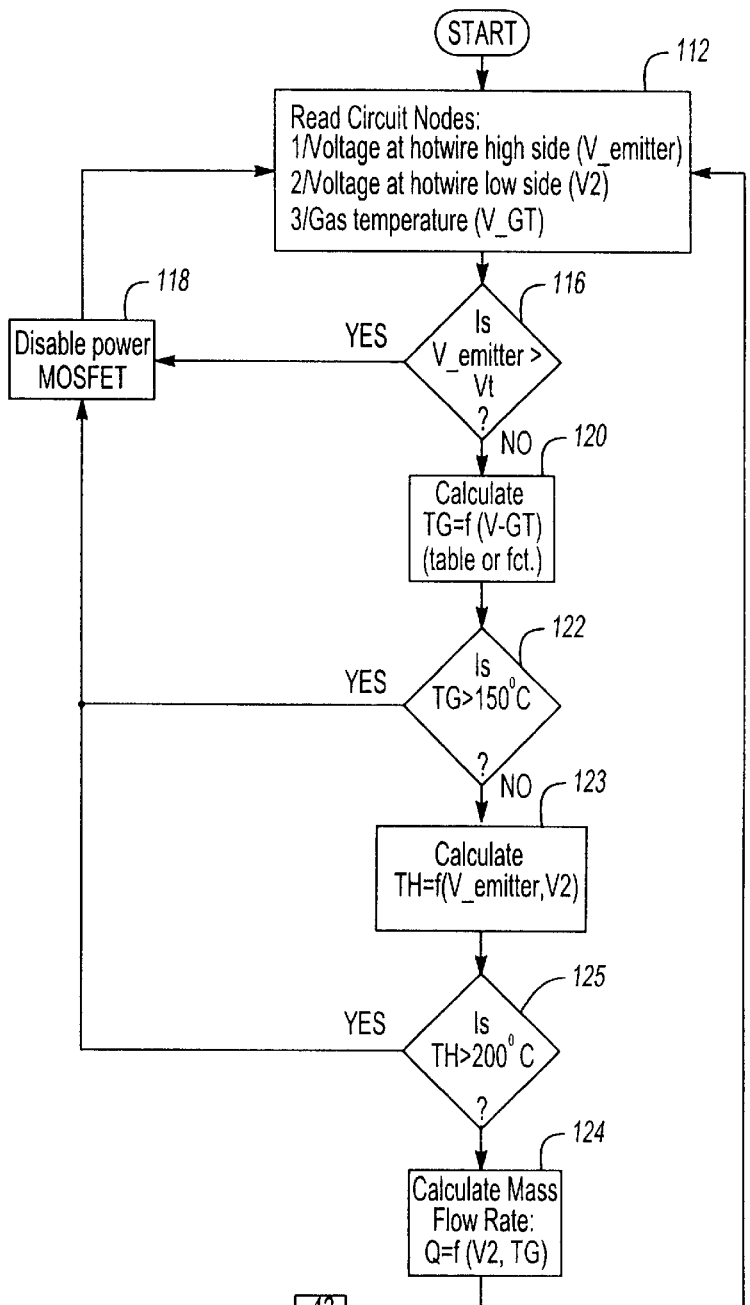
FIG. 10 is a flow chart used in connection with the circuitry of FIG. 9.

With reference now to FIG. 10, a simplified flow chart is there shown which is used in connection with the circuitry of FIG. 9. At step 112 the microprocessor 100 reads various circuit nodes including the voltage at the end 44 of the hot wire 18 through the A/D converter 102, the voltage $V_2$ at the low end of the hot wire sensor 18 through a further A/D converter 114 as well as the gas temperature through any conventional sensor. Step 112 then branches to step 116.

At step 116, the processor 100 determines if the voltage at the high end 44 of the hot wire 18 is greater than a preset voltage value $V_T$. If so, step 116 branches to step 118 in which the processor 100 generates a signal through the I/O port 106 to switch the electronic switch 104 to an open position thus terminating current flow through the hot wire 18. Step 118 then branches to step 112 where the above process is repeated.

Assuming, however, that the hot wire 18 is operating within an acceptable range, the voltage at the high end 44 of the hot wire 18 is less than $V_T$ and step 116 branches to step 120. At step 120, the gas temperature $T_G$ is calculated and step 120 then branches to step 122. At step 122 the gas temperature $T_G$ is compared with the maximum permitted amount of 150° C. If the temperature of the gas exceeds 150° C., step 122 branches to step 118 again switching the switch 104 to an open position and terminating current flow through the hot wire 18. Otherwise, step 122 branches to step 123.

At step 123, the hot wire temperature $T_H$ is either determined or estimated and step 123 then branches to step 125. At step 125, the hot wire temperature $T_H$ is compared with a preset constant value, such as 220° C. If the hot wire temperature $T_H$ is greater than the preset value, indicative of a failure situation, step 125 branches to step 118 and switches the switch 104 to an open position. Otherwise, step 125 branches to step 124 where the CPU calculates the mass gas flow rate through the flow meter. Step 124 then branches back to step 112 and the above process is reiteratively repeated.

Figure 11:
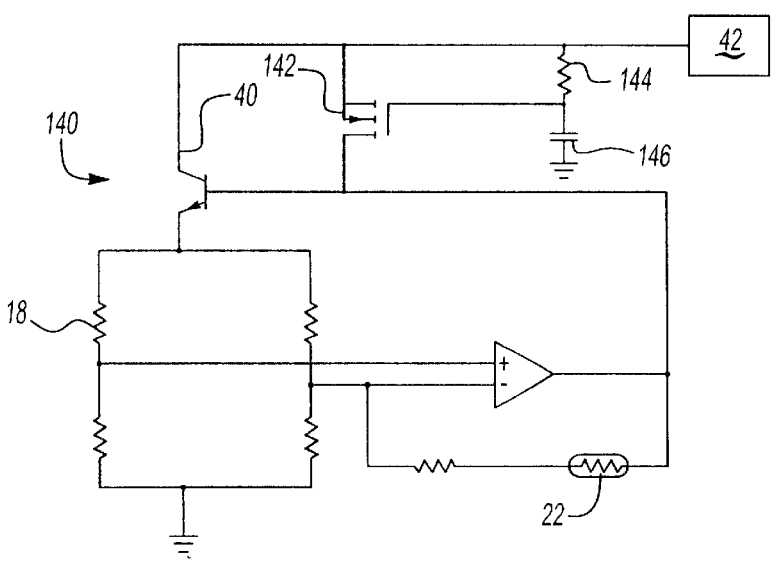
FIG. 11 is a schematic view of a control circuit for the flow sensor, but illustrating circuitry to augment current flow through the hot wire following initial energization of the control circuit.

With reference now to FIG. 11, a circuit 140 is there shown which augments the initial current flow to the hot wire 18 following the initial energization of the hot wire control circuit 140. As shown in FIG. 11, an electronic switch 142, such as an FET, has its drain and source connected between the power source 42 and the base of the driving transistor 40. The gate of the FET 142 in turn is connected to the power source 42 through a resistor 144 while a capacitor 146 couples the gate of the FET 142 to ground. The resistor 144 and capacitor 146 thus form an RC timing circuit which closes the electronic switch 142 for a transient time period following energization of the circuit 140 by the power source 42. In doing so, the switch 142 provides a positive input to the base of the driving transistor 40 thereby turning the driving transistor 40 on and augmenting the initial current to the hot wire 18 following energization of the circuit.

Figure 12:
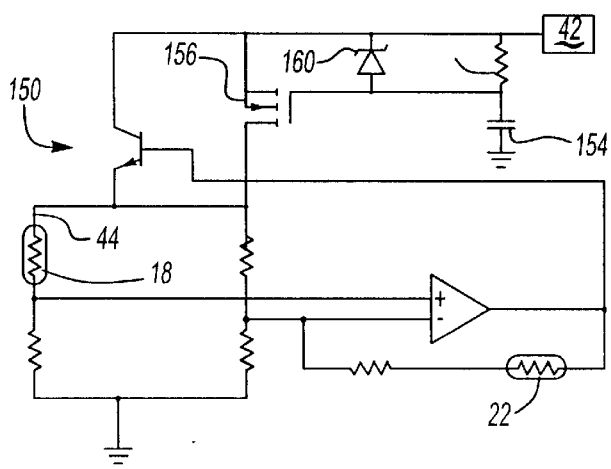
FIG. 12 is a view similar to FIG. 11, but illustrating a modification thereof.

With reference now to FIG. 12, a modified control circuit 150 which also provides augmentation of the current flow to the hot wire 18 for a transient time period following energization of the control circuit 150 is shown. Like the circuit illustrated in FIG. 11, a resistor 152 and capacitor 154 provide an RC timing circuit to an electronic switch 156, such as a MOSFET. Unlike the circuit shown in FIG. 11, however, the source and drain of the MOSFET 156 are connected between the power source 142 and the hot end 44 of the hot wire 18. Thus, upon energization of the circuit 150, the power supply 42 is directly connected through the MOSFET 156 to the hot wire 18 for a transient period of time following energization of the circuit 150 as determined by the values of the resistor 152 and capacitor 154. Optionally, a Zener diode 160 is connected in parallel with the resistor 152 to protect the hot wire 18 from an excessive voltage level at the source 42.

Figure 13:
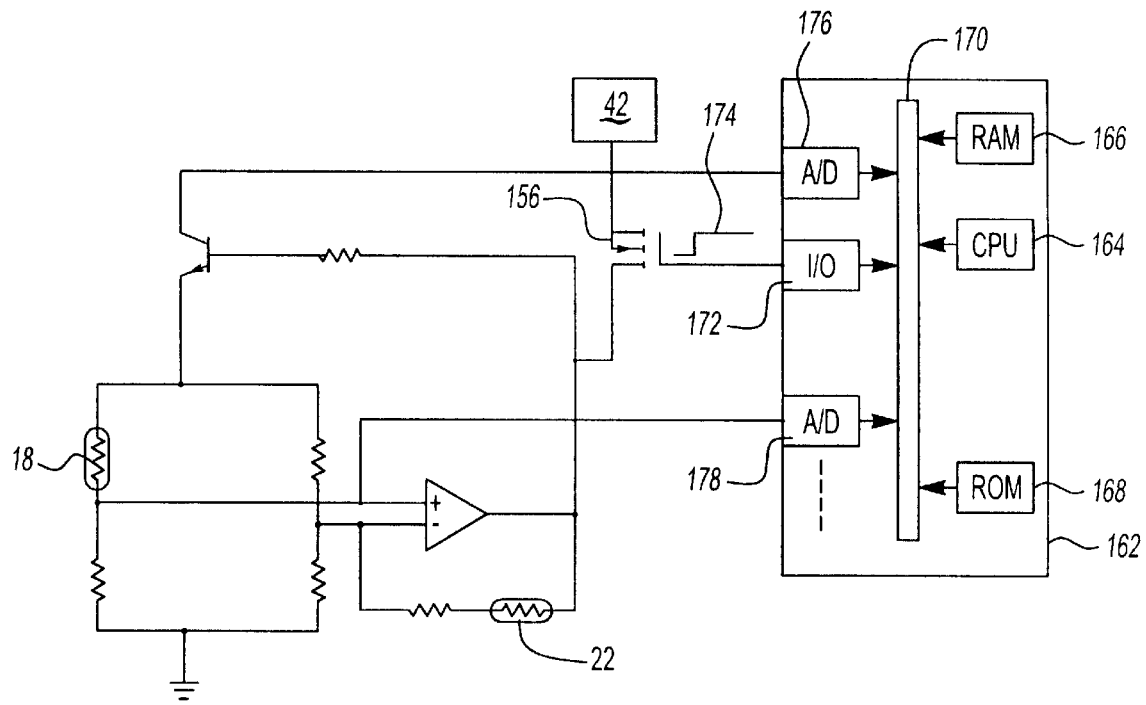
FIG. 13 is a view similar to FIGS. 11 and 12, but illustrating a modification thereof.

With reference now to FIG. 13, the control of the MOSFET switch 156 to augment the current flow through the hot wire 18 after energization of the sensor control circuit may alternatively be accomplished through a microcontroller 162. The microcontroller 162, which also preferably provides the output signals indicative of the flow rate through the sensor, includes a microprocessor 164 having access to both random access memory 166 and read only memory 168 through a system bus 170. The gate of the MOSFET switch 156 is controlled by the microprocessor 164 through an input/output port 172. Thus, following initial energization of the sensor circuit, the microprocessor 164 outputs a switching signal indicated at 174 to the gate of the MOSFET 156 through the I/O port 172 to turn the MOSFET 156 into a conductive mode during initial energization thus augmenting the current flow to the hot wire 18.

Still referring to FIG. 13, an analog to digital converter 176 provides an input signal to the microprocessor 164 indicative of the voltage of the power source 42. Similarly, a second analog/digital converter 178 provides an input signal to the microprocessor 164 indicative of the voltage of the low side of the hot wire 18.

With reference now to FIG. 14, a flow chart used in connection with the circuit of FIG. 13 is there shown. At step 180, the microprocessor 164 initializes various variables, such as $t_{old}$ and the warm up flag WU, and then branches to step 182 where the microprocessor 164 inputs system variables including the voltage of the power source 42 $V_{battery}$, the voltage of the low side of the hot wire $V_2$ and the gas temperature $V_{GT}$. Step 182 then branches to step 184.

At step 184, the program determines if the voltage of the battery is less than five volts, i.e. an unacceptably low value. If so, step 184 branches back to step 182 and the above process is reiterated.

Assuming that the battery voltage $V_{battery}$ is greater than five volts, step 184 instead branches to step 186 which tests the warm up flag to determine if the warm up flag is equal to one, indicative that the warm up cycle has been completed. Assuming that the warm up cycle has not yet been completed, step 184 branches to step 188. Otherwise, step 186 branches to step 190 where the gas mass flow rate is determined in the conventional fashion by the microprocessor 164. Assuming, however, that the warm up has not been completed, step 188 calculates the gas temperature TG based on internal tables contained in the microprocessor ROM and then branches to step 190.

At step 190, the microprocessor calculates the MOSFET on time $t_{on}$ as a function both of the battery voltage $V_{battery}$ and the gas temperature TG. Step 190 then branches to step 192.

At step 192, the program determines if the MOSFET on time is equal to the variable $t_{old}$. During the initial execution of step 192, $t_{on}$ will never equal $t_{old}$ in which case step 192 branches to step 194 where an internal counter representative of the desired on time for the MOSFET to achieve the current augmentation is reset to zero. Step 194 then restarts the counter and branches to step 196 where the value $t_{old}$ is set to the calculated value $t_{on}$. Step 196 then branches to step 198.

At step 198, the program determines if the calculated MOSFET on time $t_{on}$ is greater than the internal counter. During the initial execution of step 198, the calculated on time $t_{on}$ for the MOSFET will always be greater than the counter in which case step 198 branches to step 200 where the microprocessor 164 (FIG. 13) turns on the MOSFET 156 (FIG. 13) through the I/O port 172 (FIG. 13). Step 200 then branches back to step 182 where the above process is repeated.

In the next iteration through the programming loop of FIG. 14 and assuming that both the warm up flag is zero and the battery voltage $V_{battery}$ is greater than five volts, step 192 will instead branch to step 202 since the calculated MOSFET on time $t_{on}$ equals the variable $t_{old}$ as previously set at step 196. Step 192 merely continues the counting of the internal counter.

Following the desired warm up time for the hot wire 18, the MOSFET on time $t_{on}$ will eventually equal or exceed the internal counter. When this happens, step 198 will branch to step 204 instead of step 200. At step 204, the microprocessor 164 outputs a signal through its I/O port 172 to turn the MOSFET 156 off thus terminating the increased current flow to the hot wire 18. Step 204 then branches to step 206 where the warm up flag WU is set to one indicative that the warm up is completed. Step 206 then branches back to step 182 and steps 182, 184, 186 and 190 continuously iterate to calculate the flow rate through the sensor in the desired fashion.

Figure 15:
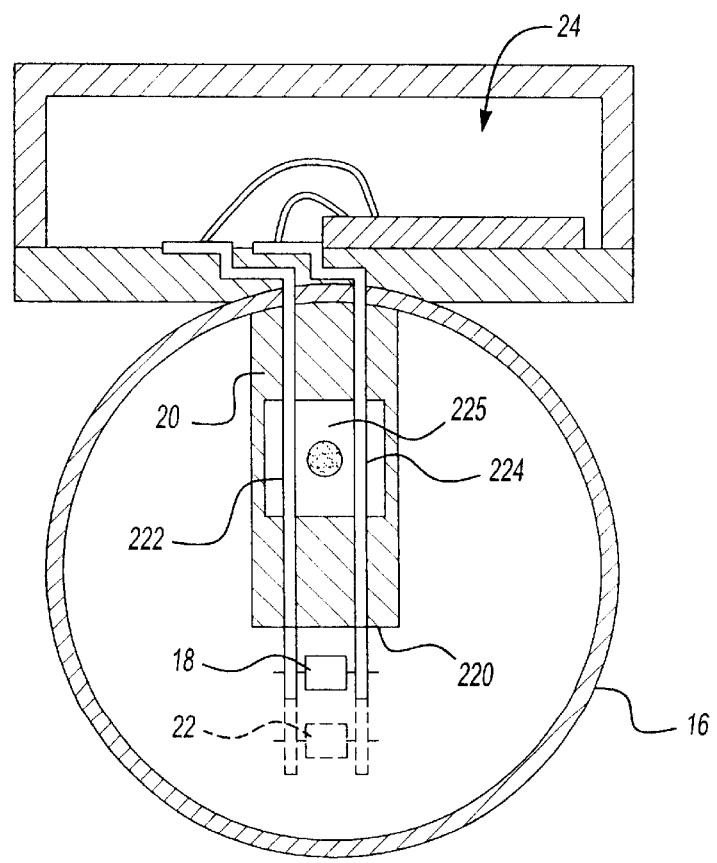
FIG. 15 is a plan view illustrating a portion of the gas flow sensor of the present invention.

With reference now to FIG. 15, an enlarged view of the housing bypass tube 16 is there shown with the post 20 supporting the hot wire 18 at the end 220 of the post 20. In the conventional fashion, the hot wire 18 is electrically connected to the control circuit by lead wires 222 and 224. These lead wires 222 and 224 extend through the post 20. Similarly, the leads for the cold wire 22 similarly extend through the post 20.

In order to seal the leads 222 and 224 for the hot wire 18, as well as the leads (not shown) for the cold wire 22, a cavity 226 is formed on the interior of the post 20 so that the leads for both the hot wire and cold wire extend through the cavity 226. The cavity 226 is then filled with an adhesive which completely fills the cavity 226 thereby effectively sealing the leads for both the hot wire 18 and cold wire 22 against gas leakage.

Figure 16:
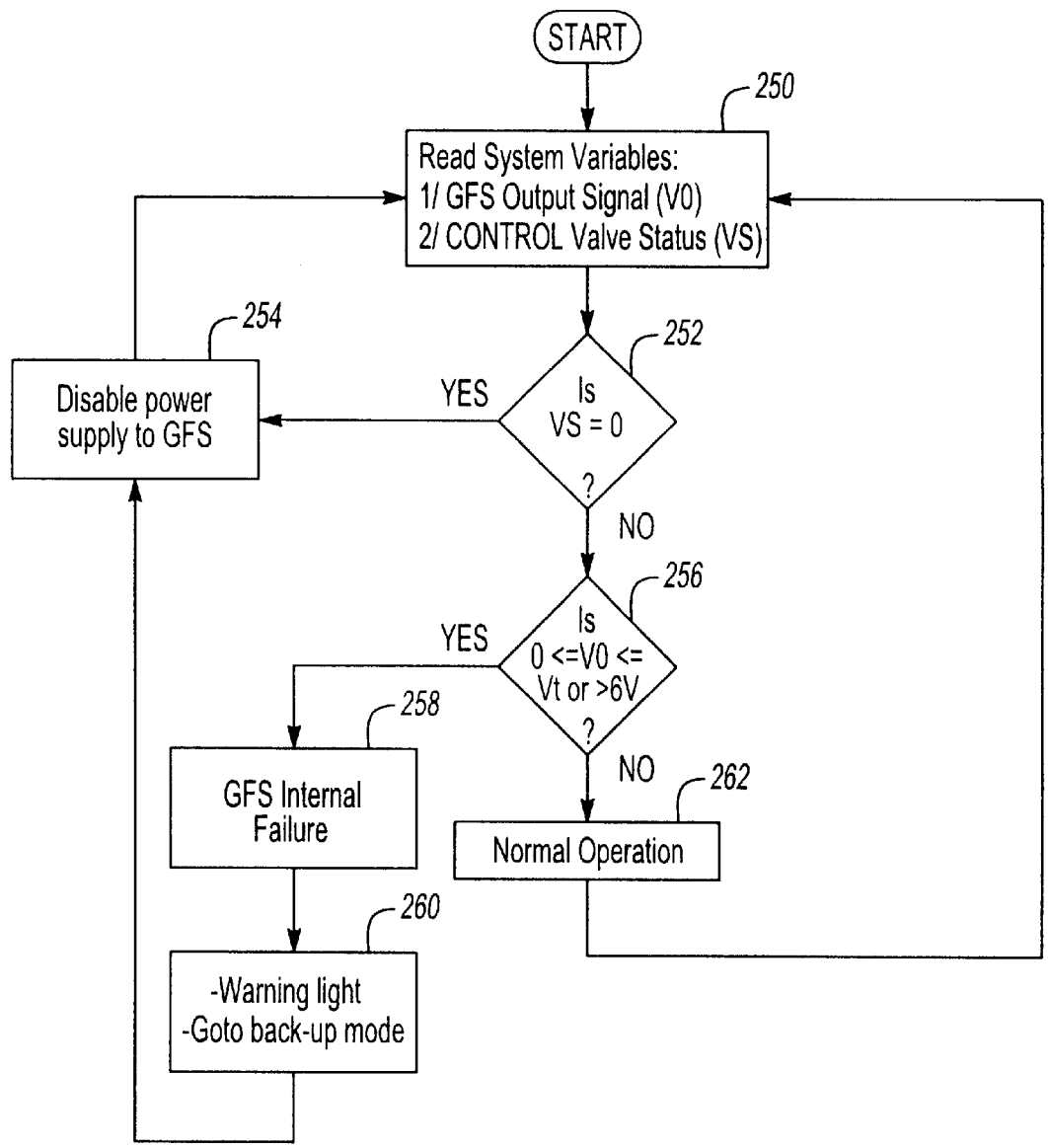
FIG. 16 is a general diagnostics flow chart used by the control circuit of the present invention.

With reference now to FIG. 16, a flow chart is there shown which provides general diagnostics for the gas flow sensor to prevent activation of the gas flow sensor in the event of certain system failures. More specifically, at step 250, the microprocessor 164 (FIG. 13) reads various system variables including the output signal from the gas flow sensor $V_O$ as well as the control valve status VS. Step 250 then branches to step 252.

At step 252, the system determines if the control valve status VS is equal to zero, indicative that the control unit is not requiring flow. If so, step 252 branches to step 254 which disables the power to the gas flow sensor 10 and thus the power to the hot wire 18. Step 254 then branches back to step 250 where the above steps are reiterated.

Assuming, however, that the control valve status VS is not equal to zero, step 252 branches to step 256 where the program determines if the sensor output signal $V_O$ is between zero volts and a voltage threshold variable $V_T$. An output signal $V_O$ outside of the range 0–$V_T$ is indicative of a system failure in which case step 256 branches to step 258 where the program sets a flag indicating that the flow sensor has failed. Step 258 then branches to step 260 which outputs a warning signal to the vehicle operator and also enters a backup mode to prevent continued operation of the system without the proper input from the flow sensor. Step 260 then branches to step 254 where the power to the flow sensor is disabled and then back to step 250 where the above process is repeated.

Assuming, however, that the output signal $V_O$ from the flow sensor is within an acceptable range, step 256 instead then branches to step 262 where a flag indicative of normal operation is set. Step 262 then branches back to step 250 where the above process is repeated.

From the foregoing, it can be seen that the present invention provides numerous improvements for gas flow sensors. Having described our invention, however, many modifications thereto will become apparent to those skilled in the art to which it pertains without deviation from the spirit of the invention as defined by the scope of the appended claims.

We claim:

1. A gas flow sensor for a gaseous flow of a gaseous fuel through a passageway comprising:
    a housing having a through passage, said housing being mounted so that said housing through passage; is fluidly in series with said passageway,
    a cold element mounted to said housing so that said cold element is positioned in said passage,
    a hot element made of a resistive material mounted to said housing so that said hot element is positioned in said passageway,
    a circuit which maintains the temperature differential between said hot element and said cold element in the range of 30° C. to 100° C. by varying current flow through said hot element,
    wherein the magnitude of current flow through said hot element is proportional to the gas flow rate through said passage.

2. The invention as defined in claim 1 and comprising means for limiting current flow through said hot element to a preset amount.

3. The invention as defined in claim 1 wherein said maintaining mean maintains said temperature differential at substantially 65° C.

4. The invention as defined in claim 1 wherein said gas is substantially hydrogen.

5. The invention as defined in claim 1 wherein said gas is substantially methane.

6. The invention as defined in claim 1 wherein said gas is substantially propane.

7. The invention as defined in claim 1 and further comprising a coating disposed around and encasing said hot element, said coating being constructive of an electrical insulating material.

8. The invention as defined in claim 7 wherein said insulating material comprises glass.

9. The invention as defined in claim 7 wherein said insulating material comprises polyamide.

10. The invention as defined in claim 7 wherein said insulating material comprises epoxy.

11. The invention as defined in claim 7 wherein at least a portion of said hot element is made of stainless steel.

12. The invention as defined in claim 7 wherein at least a portion of said hot element is made of nickel.

13. The invention as defined in claim 7 wherein at least a portion of said hot element is made of gold.

14. The invention as defined in claim 1 and comprising means for suppressing sparks from said hot wire.

15. The invention as defined in claim 14 wherein said spark suppressing means comprises a coating of electrical insulating material disposed around said hot wire.

16. The invention as defined in claim 1 wherein an operating temperature of said gaseous flow is less than the temperature of said hot wire.

17. A gas flow sensor which provides an output signal representative of the gas flow rate through a passageway comprising:
    a housing having a through passage, said housing being mounted so that said housing through passage is fluidly in series with said passageway,
    a cold element mounted to said housing so that said cold element is positioned in said passage,
    a hot element made of a resistive material mounted to said housing so that said hot element is positioned in said passageway,
    circuit means for varying current flow through said hot element to maintain a predetermined temperature differential between said hot element and said cold element,
    means for limiting current flow through said hot element to a preset amount in the event of failure of a component of said circuit means or failure of said cold element.

18. The invention as defined in claim 17 and comprising means for maintaining the temperature differential between the hot element and cold element in the range of 30° C.

19. The invention as defined in claim 17 and comprising means for augmenting current flow through the hot element for a limited time period following electrical energization of the flow meter.

20. The invention as defined in claim 17 wherein said circuit means includes a driving transistor having one of its emitter or collector connected to said hot wire and wherein said current limiting means comprises a Zener diode electrically connected between the base of said driving transistor and ground.

21. The invention as defined in claim 17 wherein one end of said hot element is connected to a power source and the other end of the hot element is connected to ground and wherein said current limiting means comprises a Zener diode electrically connected between said one end of said hot element and ground.

22. The invention as defined in claim 17 wherein said circuit means includes a driving transistor having one of its emitter or collector connected to said hot element and wherein said current limiting means comprises a Zener diode electrically connected between one of its emitter or collector of said driving transistor and ground.

23. The invention as defined in claim 17 wherein one end of said hot element is connected to a power source and the other end of the hot element is connected to ground and wherein said current limiting means comprises a switch connected in series with said hot element, a voltage comparator having one input connected to said one end of said hot element and a second input connected to a preset voltage constant, said comparator having an output connected to said switch to activate said switch to an open position whenever the voltage at said one end of said hot element exceeds said predetermined voltage.

24. The invention as defined in claim 23 wherein said comparator comprises a microprocessor.

25. A gas flow sensor which provides an output signal representative of the gas flow rate through a passageway comprising:
    a housing having a through passage, said housing being mounted so that said housing through passage is fluidly in series with said passageway,
    a cold element mounted to said housing so that said cold element is positioned in said passage,
    a hot element made of a resistive material mounted to said housing so that said hot element is positioned in said passageway,
    circuit means for augmenting current flow through said hot element for a limited time period following electrical energization of the flow sensor.

26. The invention as defined in claim 25 and comprising means for maintaining the temperature differential between the hot element and cold element in the range of 30° C.

27. The invention as defined in claim 25 and comprising means for limiting current flow through said hot element to a preset amount.

28. The invention as defined in claim 25 wherein said circuit means comprises an electronic switch connected between said hot element and an electrical power source, and a timing circuit connected to said power source, said timing circuit having an output signal which activates said electronic switch to a closed position for only a predetermined time period following electrical energization of said flow sensor.

29. The invention as defined in claim 28 wherein said timing circuit comprises an RC timing circuit.

30. The invention as defined in claim 28 and comprising a driving transistor having its emitter-collector circuit connected in series between said power source and said hot element, and wherein said electronic switch is connected between said power source and the base of said driving transistor.

31. The invention as defined in claim 30 wherein said electronic switch comprises a voltage comparator.

32. The invention as defined in claim 30 wherein said electronic switch comprises a further transistor.

\* \* \* \* \*